United States Patent
Li et al.

(10) Patent No.: US 12,470,149 B2
(45) Date of Patent: Nov. 11, 2025

(54) BIDIRECTIONAL DC/DC CONVERTER, CONTROL METHOD THEREOF, AND VEHICLE

(71) Applicant: Huawei Digital Power Technologies Co., Ltd., Shenzhen (CN)

(72) Inventors: Yanfeng Li, Shenzhen (CN); Yu Ma, Shenzhen (CN); Yongsheng Zhou, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 296 days.

(21) Appl. No.: 18/361,151

(22) Filed: Jul. 28, 2023

(65) Prior Publication Data
US 2023/0369985 A1  Nov. 16, 2023

Related U.S. Application Data

(63) Continuation of application No. PCT/CN2021/074344, filed on Jan. 29, 2021.

(51) Int. Cl.
*H02M 3/335* (2006.01)
*B60L 53/22* (2019.01)
*H02J 7/06* (2006.01)

(52) U.S. Cl.
CPC ......... *H02M 3/33584* (2013.01); *B60L 53/22* (2019.02); *H02J 7/06* (2013.01); *H02M 3/33573* (2021.05); *B60L 2210/10* (2013.01); *H02J 2207/20* (2020.01)

(58) Field of Classification Search
CPC .......... H02M 3/33573; H02M 3/33584; B60L 53/22; B60L 2210/10; H02J 7/06; H02J 2207/20
USPC ....................................... 363/21.01
See application file for complete search history.

(56) References Cited

U.S. PATENT DOCUMENTS

| | | | |
|---|---|---|---|
| 2014/0233265 A1* | 8/2014 | Hirano | H02M 3/33576 363/17 |
| 2018/0269795 A1* | 9/2018 | Zhou | H02M 3/33592 |
| 2021/0108392 A1* | 4/2021 | Hahn | E02F 3/96 |

FOREIGN PATENT DOCUMENTS

| | | |
|---|---|---|
| CN | 109383328 A | 2/2019 |
| CN | 111478588 A | 7/2020 |
| CN | 111682774 A | 9/2020 |

\* cited by examiner

*Primary Examiner* — Yemane Mehari
(74) *Attorney, Agent, or Firm* — Slater Matsil, LLP

(57) ABSTRACT

A bidirectional DC/DC converter includes a first terminal circuit, a transformer, a second terminal circuit, and a reset circuit, and the transformer includes a first winding and a second winding. The first terminal circuit is coupled to the first winding, and the second terminal circuit and the reset circuit are coupled to the second winding. In a first time period in which the bidirectional DC/DC converter is in a second working state, the second terminal circuit transmits a second alternating current to the first terminal circuit by using the second winding and the first winding; and in a second time period in which the bidirectional DC/DC converter is in the second working state, the reset circuit is in a conducted state, to reset the second winding.

16 Claims, 12 Drawing Sheets

Phase-shift full-bridge circuit

Synchronous rectifier circuit t1–t2

BIDIRECTIONAL DC/DC CONVERTER, CONTROL METHOD THEREOF, AND VEHICLE

CROSS-REFERENCE TO RELATED APPLICATIONS

This application is a continuation of International Application No. PCT/CN2021/074344, filed on Jan. 29, 2021, the disclosure of which is hereby incorporated by reference in its entirety.

TECHNICAL FIELD

This application relates to the field of power technologies, and in particular, to a bidirectional DC/DC converter, a control method thereof, and a vehicle.

BACKGROUND

A DC/DC converter (Direct-Current/Direct-Current converter) is a voltage converter that processes an input direct current and converts the input direct current into a specified output direct current. A DC/DC converter shown in FIG. 1 is used as an example. The DC/DC converter includes a phase-shift full-bridge circuit, a transformer, and a synchronous rectifier circuit. An input end of the phase-shift full-bridge circuit is connected to a first direct current power. The phase-shift full-bridge circuit converts a direct current provided by the direct current power into an alternating current, and applies the alternating current to a primary-side coil of the transformer. A secondary-side coil of the transformer induces another alternating current. Magnitudes of a secondary-side alternating current and a primary-side alternating current are related to a turn ratio of the transformer. The synchronous rectifier circuit rectifies, into a direct current, the alternating current induced by the secondary-side coil of the transformer, and provides the direct current to a load. Energy of the DC/DC converter can only be transmitted from a side of the phase-shift full-bridge circuit to a side of the synchronous rectifier circuit, but cannot be transmitted from the side of the synchronous rectifier circuit to the side of the phase-shifted full-bridge circuit. In other words, bidirectional energy flow of the DC/DC converter cannot be implemented in the conventional technology.

SUMMARY

This application provides a bidirectional DC/DC converter, a control method thereof, and a vehicle, to implement bidirectional energy transmission of a DC/DC converter.

According to a first aspect of embodiments of this application, a bidirectional DC/DC converter is provided. The bidirectional DC/DC converter includes a first terminal circuit, a transformer, a second terminal circuit, and a reset circuit, and the transformer includes a first winding and a second winding. The first terminal circuit is coupled to the first winding, and the second terminal circuit and the reset circuit are coupled to the second winding.

When the bidirectional DC/DC converter is in a first working state, the first terminal circuit is configured to transmit a first alternating current to the second terminal circuit by using the first winding and the second winding, the second terminal circuit is configured to convert the first alternating current into a first direct current, and the reset circuit is in a broken state.

In a first time period in which the bidirectional DC/DC converter is in a second working state, the second terminal circuit is configured to transmit a second alternating current to the first terminal circuit by using the second winding and the first winding, and the first terminal circuit is configured to convert the second alternating current into a second direct current; in a second time period in which the bidirectional DC/DC converter is in the second working state, the reset circuit is in a conducted state, and is configured to reset the second winding; and in the second time period, the second terminal circuit stops transmitting the second alternating current to the first terminal circuit.

According to this embodiment of this application, the reset circuit is added, to implement bidirectional energy transmission of the DC/DC converter. Implementation of this embodiment of this application has strong applicability.

With reference to the first aspect, in a first possible implementation, the second winding has a central tap, and the central tap is configured to divide the second winding into a first sub-winding and a second sub-winding.

That the second terminal circuit and the reset circuit are coupled to the second winding is specifically implemented as follows:

The second terminal circuit is separately coupled to a dotted terminal of the first sub-winding, the central tap, and an undotted terminal of the second sub-winding; and the reset circuit is coupled between the dotted terminal of the first sub-winding and a reference ground or is coupled between the undotted terminal of the second sub-winding and the reference ground.

According to this embodiment of this application, the reset circuit is added based on an existing DC/DC converter structure, and the reset circuit and the second winding perform resonant resetting, so that the energy of the DC/DC converter may be bidirectionally transmitted.

With reference to the first aspect, in a second possible implementation, the second winding has a central tap, and the central tap is configured to divide the second winding into a first sub-winding and a second sub-winding.

That the second terminal circuit and the reset circuit are coupled to the second winding is specifically implemented as follows:

The second terminal circuit is separately coupled to a dotted terminal of the first sub-winding, the central tap, and an undotted terminal of the second sub-winding; and the reset circuit is coupled between the central tap and the dotted terminal of the first sub-winding or is coupled between the central tap and the undotted terminal of the second sub-winding.

According to this embodiment of this application, a coupling point of the reset circuit is changed, so that an active clamping circuit may be formed between the reset circuit and the first sub-winding or the second sub-winding. Energy of the first sub-winding and the second sub-winding is transferred to a first capacitor in the reset circuit through the active clamping circuit, so that bidirectional energy transmission of the DC/DC converter may be implemented.

With reference to any one of the first aspect and the possible implementations of the first aspect, in a third possible implementation, the reset circuit includes a first capacitor and a first switch connected in series to the first capacitor, and the first switch is configured to control the first capacitor to reset the second winding.

With reference to the third possible implementation of the first aspect, in a fourth possible implementation, a corresponding working period in which the bidirectional DC/DC converter is in the second working state includes the first time period, the second time period, a third time period, and a fourth time period.

The first switch is configured to: control, in the second time period, the first sub-winding to form a first reset loop with the first capacitor, reset the first capacitor in a short-circuit manner in the first time period, and break the first reset loop in the third time period and the fourth time period.

The reset circuit further includes a second switch, and the second switch is configured to: control, in the fourth time period, the second sub-winding to form a second reset loop with the first capacitor, break the second reset loop in the first time period and the second time period, and reset the first capacitor in a short-circuit manner in the third time period.

The reset circuit in this embodiment of this application resets different sub-windings in different time periods by using two switches, so that energy utilization may be further improved on the basis that bidirectional energy transmission is implemented.

With reference to the third possible implementation of the first aspect, in a fifth possible implementation, a corresponding working period in which the bidirectional DC/DC converter is in the second working state includes the first time period, the second time period, a third time period, and a fourth time period.

The reset circuit further includes a third switch and a fourth switch.

The third switch is coupled to the dotted terminal of the first sub-winding, the fourth switch is coupled to the undotted terminal of the second sub-winding, and the third switch and the fourth switch are connected in parallel and then are connected in series to the first switch and the first capacitor.

The third switch and the first switch are configured to control, in the second time period, the first sub-winding to form a third reset loop with the first capacitor.

The fourth switch and the first switch are configured to control, in the fourth time period, the second sub-winding to form a fourth reset loop with the first capacitor.

The first switch is further configured to: break the third reset loop in the first time period, and break the fourth reset loop in the third time period.

According to this embodiment of this application, the third switch and the fourth switch are added, so that the first sub-winding or the second sub-winding may be selected in different time periods to form a closed loop with the reset circuit. In other words, according to this embodiment of this application, a winding is reset in an active-clamping manner, and two formed forward circuits may alternately perform energy transmission in positive and negative half cycles of an alternating current, so that energy utilization may be further improved on the basis that bidirectional energy transmission is implemented.

According to a second aspect of embodiments of this application, a bidirectional DC/DC converter control method is provided. The control method is applicable to the bidirectional DC/DC converter according to any one of the first aspect and the possible implementations of the first aspect. A first terminal circuit, a second terminal circuit, and a reset circuit are all coupled to a processor, and the control method is applicable to the processor, and includes:

in a first time period in which the bidirectional DC/DC converter is in a second working state, controlling the second terminal circuit to transmit a second alternating current to the first terminal circuit by using a second winding and a first winding, and controlling the first terminal circuit to convert a second alternating current into a second direct current;

in a second time period in which the bidirectional DC/DC converter is in the second working state, controlling the second terminal circuit to stop transmitting the second alternating current to the first terminal circuit, and controlling the reset circuit to be conducted, so as to reset the second winding; and when the bidirectional DC/DC converter is in a first working state, controlling the first terminal circuit to transmit a first alternating current to the second terminal circuit by using the first winding and the second winding, controlling the second terminal circuit to convert the first alternating current into a first direct current, and controlling the reset circuit to be broken.

With reference to the second aspect, in a first possible implementation, the reset circuit includes a first capacitor and a first switch connected in series to the first capacitor; and the controlling the reset circuit to be conducted, so as to reset the second winding includes:
controlling the first switch to be turned on, to enable the first capacitor to reset the second winding.

With reference to the first possible implementation of the second aspect, in a second possible implementation, a corresponding working period in which the bidirectional DC/DC converter is in the second working state includes the first time period, the second time period, a third time period, and a fourth time period;

the reset circuit further includes a second switch, the first switch is coupled to a dotted terminal of a first sub-winding, the second switch is coupled to an undotted terminal of a second sub-winding, and the first switch and the second switch are connected in parallel and then are connected in series to the first capacitor; and the controlling the first switch to be turned on, to reset the second winding is specifically implemented as follows:
controlling the first switch to be turned on in the second time period, to enable the first sub-winding to form a first reset loop with the first capacitor, controlling the first switch to be turned on in the first time period, to reset the first capacitor in a short-circuit manner, and controlling the first switch to be turned off in the third time period and the fourth time period; and
controlling the second switch to be turned on in the fourth time period, to enable the second sub-winding to form a second reset loop with the first capacitor, controlling the second switch to be turned on in the third time period, to reset the first capacitor in a short-circuit manner, and controlling the second switch to be turned off in the first time period and the second time period.

With reference to the first possible implementation of the second aspect, in a third possible implementation, a corresponding working period in which the bidirectional DC/DC converter is in the second working state includes the first time period, the second time period, a third time period, and a fourth time period;

the reset circuit includes a third switch and a fourth switch, the third switch is coupled to a dotted terminal of a first sub-winding, the fourth switch is coupled to an undotted terminal of a second sub-winding, and the third switch and the fourth switch are connected in parallel and then are connected in series to the first switch and the first capacitor; and the controlling the first switch to be turned on, to reset the second winding is specifically implemented as follows:

controlling the third switch and the first switch to be turned on in the second time period, to control the first sub-winding to form a third reset loop with the first capacitor, and controlling the first switch to be turned off in the first time period, to break the third reset loop; and controlling the fourth switch and the first switch to be turned on in the first time period, to control the second sub-winding to form a fourth reset loop with the first capacitor, and controlling the first switch to be turned off in the third time period, to break the fourth reset loop.

According to a third aspect of embodiments of this application, a vehicle power supply system is provided. The vehicle power supply system includes a power battery, a storage battery, a bus capacitor, a motor controller, a contactor, and the bidirectional DC/DC converter according to any one of the first aspect and the possible implementations of the first aspect.

The motor controller and the bus capacitor are coupled to two ends of a first terminal circuit of the bidirectional DC/DC converter in parallel, and the motor controller is configured to control rotation of a motor, to supply power to a vehicle.

The power battery is coupled to the motor controller and the bus capacitor through the contactor.

The storage battery is coupled to two ends of the second terminal circuit of the bidirectional DC/DC converter in parallel, and the storage battery is configured to pre-charge the bus capacitor by using the bidirectional DC/DC converter when the bidirectional DC/DC converter is in a second working state.

The contactor is configured to be turned on when a difference between a voltage between two ends of the bus capacitor and a voltage between two ends of the power battery is less than a preset threshold, to enable the bidirectional DC/DC converter to enter a first working state, and the power battery is configured to supply power to the storage battery or another device in the vehicle by using the bidirectional DC/DC converter when the bidirectional DC/DC converter is in the first working state.

According to this embodiment of this application, the bus capacitor is pre-charged by using the bidirectional DC/DC converter according to any one of the first aspect and the possible implementations of the first aspect. Compared with the conventional technology, in this embodiment, a pre-charging circuit is reduced, and costs are reduced.

According to a fourth aspect of embodiments of this application, a vehicle is provided. The vehicle includes the vehicle power supply system described in the third aspect.

It should be understood that implementations and beneficial effects of the plurality of aspects of this application may be mutually referenced.

DETAILED DESCRIPTION OF ILLUSTRATIVE EMBODIMENTS

The following clearly describes the technical solutions in embodiments of this application with reference to the accompanying drawings in embodiments of this application. It is clearly that the described embodiments are some but not all of embodiments of this application. All other embodiments obtained by a person of ordinary skill in the art based on embodiments of this application without creative efforts shall fall within the protection scope of this application.

Figure 1:
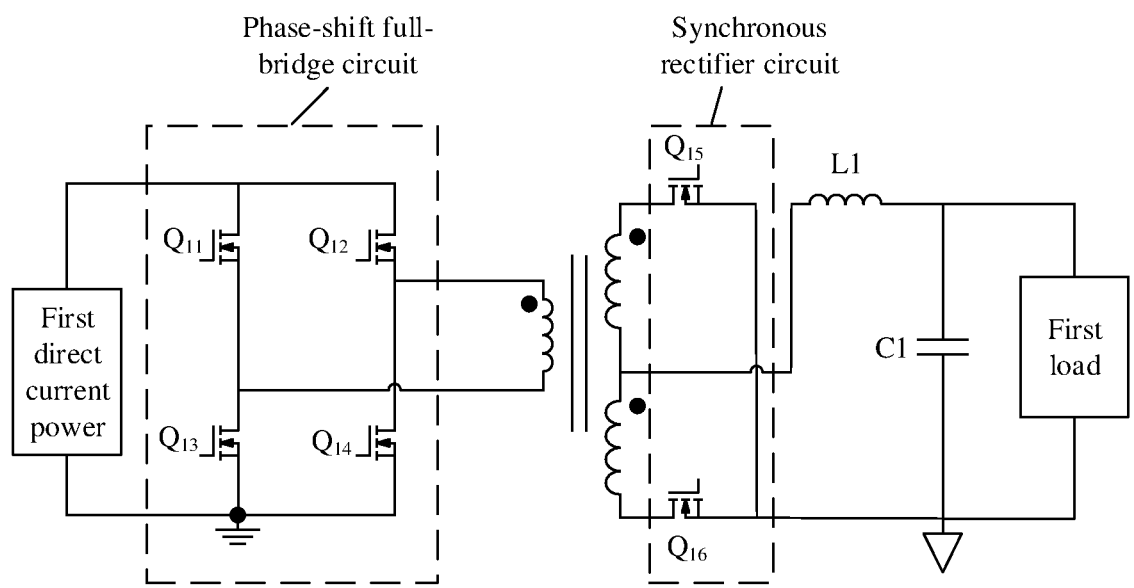
FIG. 1 shows a DC/DC converter according to the conventional technology.
Figure 2:
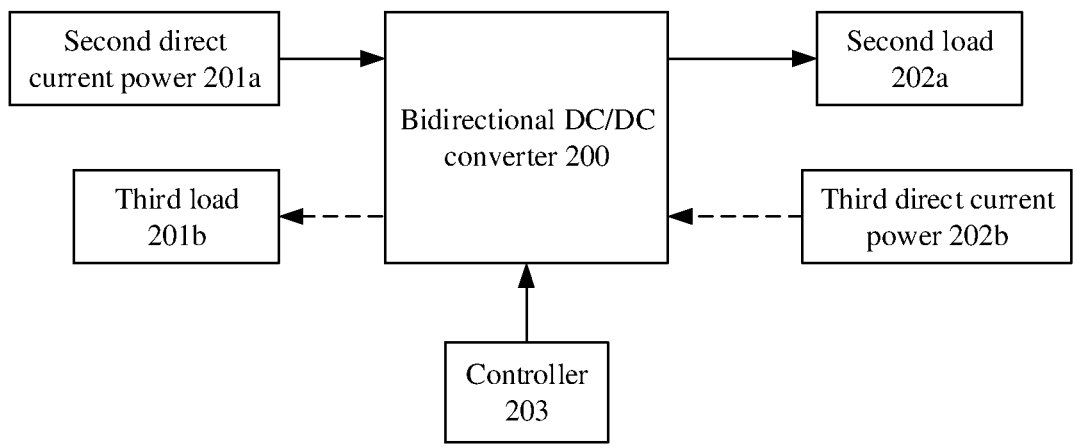
FIG. 2 is a block diagram of an application of a bidirectional DC/DC converter according to an embodiment of this application.

Embodiments of this application may be applied to a scenario of bidirectional energy transmission. Refer to FIG. 2. FIG. 2 is a block diagram of an application of a bidirectional DC/DC converter according to an embodiment of this application. As shown in FIG. 2, a second direct current power 201a and a third load 201b are coupled on one side of a bidirectional DC/DC converter 200, and a second load 202a and a third direct current power 202b are coupled on another side of the bidirectional DC/DC converter 200. When the bidirectional DC/DC converter 200 is in a first working state, the second direct current power 201a, the bidirectional DC/DC converter 200, and the second load 202a may form a first closed loop. When the bidirectional DC/DC converter 200 is in a second working state, the third direct current power 202b, the bidirectional DC/DC converter 200, and the third load 201b may form a second closed loop. A control end of the bidirectional DC/DC converter 200 is coupled to a processor 203, for controlling state switching of the bidirectional DC/DC converter 200.

It should be noted that "coupling" described in this application indicates a direct connection or an indirect connection. For example, regarding coupling between A and B, it may be that A is directly connected to B; or may be that A is indirectly connected to B through one or more other electrical components, for example, may be that A is directly connected to C and C is directly connected to B, so that A is connected to B through C.

The second direct current power 201a and/or the third direct current power 202b may be, for example, a power battery (for example, a nickel-cadmium battery, an NiMH battery, a lithium-ion battery, or a lithium-polymer battery), or a storage battery. For example, a battery voltage of the storage battery is lower than a battery voltage of the power battery. Optionally, the second direct current power 201a and/or the third direct current power 202b may be configured to be coupled to an upper-level circuit such as an AC/DC converter (Alternating Current/Direct-Current converter) or another DC/DC converter (for example, a BUCK converter, a BOOST converter, or a BUCK-BOOST converter). In other words, the second direct current power 201a and/or the third direct current power 202b may be a direct power source or may be an indirect power source that performs transmission through a circuit.

The second load 202a and/or the third load 201b may be, for example, a capacitor, a resistor, or a storage battery, and a capacitance value of the capacitor may reach hundreds of micro-farads or thousands of micro-farads.

The processor 203 may be a central processing unit (CPU), another general-purpose processor, a digital signal processor (DSP), an application-specific integrated circuit (ASIC), a field-programmable gate array (FPGA), another programmable logic device, a discrete gate, a transistor logic device, a discrete hardware component, or the like.

Figure 3:
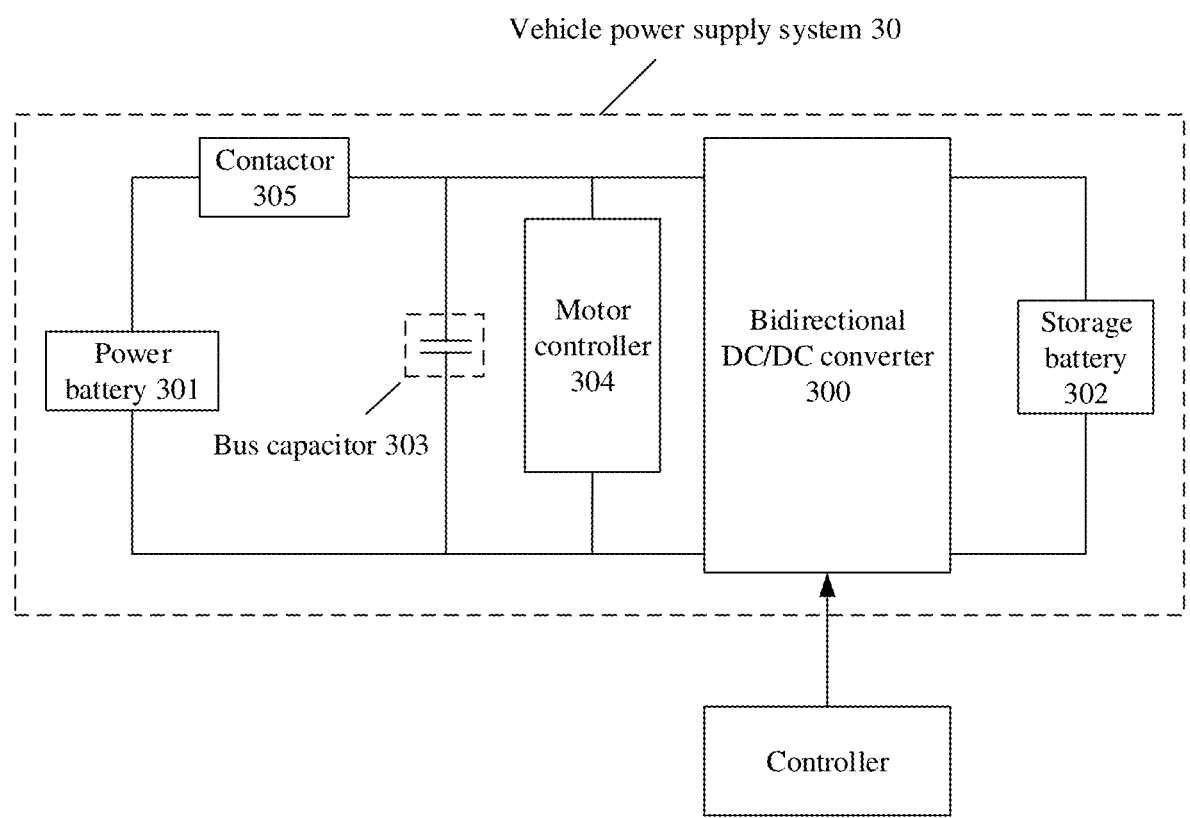
FIG. 3 is a block diagram of a structure of a vehicle power supply system according to an embodiment of this application.

In some feasible implementations, the bidirectional DC/DC converter provided in this embodiment of this application may be applied to a vehicle power supply system. In this embodiment of this application, the second load and the third direct current power are a same electronic device, for example, a battery; the second direct current is a power battery; and the third load is a capacitor. For a specific implementation, refer to FIG. 3. FIG. 3 is a block diagram of a structure of a vehicle power supply system according to an embodiment of this application. As shown in FIG. 3, a vehicle power supply system 30 includes a bidirectional DC/DC converter 300, a power battery 301, a storage battery 302, a bus capacitor 303, a motor controller 304, and a contactor 305. The motor controller 304 and the bus capacitor 303 are coupled to two ends of a first terminal circuit of the bidirectional DC/DC converter 300 in parallel. The motor controller 304 is configured to control rotation of a motor, to supply power to a vehicle. The bus capacitor 303 has a large capacitance value that may reach hundreds of microfarads or thousands of microfarads, and is configured to reduce spike pulse interference at two ends of the motor controller 304.

The power battery 301 is coupled to the motor controller 304 and the bus capacitor 303 through the contactor 305. The storage battery 302 is coupled to two ends of a second terminal circuit of the bidirectional DC/DC converter 300 in parallel.

It should be noted that a battery voltage of the power battery 301 may reach hundreds of volts. The contactor 305 is controlled to be turned on if the bus capacitor 303 is not re-charged first. A battery voltage of the power battery 301 is directly loaded to two ends of the empty bus capacitor 303. Because a voltage between two ends of a capacitor cannot be abruptly changed but a current at two ends of the capacitor may be abruptly changed, it is equivalent to that the bus capacitor 303 is instantaneously short circuited. To ensure safety of the vehicle power supply system 30, in the conventional technology, a pre-charging circuit is usually connected to two ends of the contactor 305 in parallel. The pre-charging circuit includes a pre-charging resistor and a pre-charging contactor, and the pre-charging resistor is configured to limit a current flowing through the bus capacitor 303. The power battery 301 pre-charges the bus capacitor 303 by using the pre-charging circuit. The contactor 305 is controlled to be turned on when a difference between a voltage between the two ends of the bus capacitor 303 and a voltage between two ends of the power battery 301 falls within a preset threshold range, thereby pre-charging the storage battery 302.

Different from the conventional technology, in this embodiment of this application, the bus capacitor 303 may be pre-charged by using the bidirectional DC/DC converter 300, without using a pre-charging circuit. In this way, costs may be reduced. In a specific implementation, when the bidirectional DC/DC converter 300 is in a second working state, the storage battery 302 may pre-charge the bus capacitor 303 by using the bidirectional DC/DC converter 300. For example, a processor is coupled to a control end of the bidirectional DC/DC converter 300. The processor may be a part of the vehicle power supply system, or may be independent from the vehicle power supply system. Setting of the processor is not limited in this application. The processor is configured to control a state of the bidirectional DC/DC converter 300. For example, the processor controls the bidirectional DC/DC converter 300 to enter the second working state when detecting that the vehicle is started. In this case, the contactor 305 is in a turn-off state, and the storage battery 302 pre-charges the bus capacitor 303 by using the bidirectional DC/DC converter 300.

In some feasible implementations, after the bidirectional DC/DC converter 300 enters a preset time period of the second working state, the processor controls the bidirectional DC/DC converter 300 to enter a first working state, and controls the contactor 305 to be turned on. In this case, the power battery 301 supplies power to the storage battery 302 or other devices such as an event data recorder, in the vehicle by using the bidirectional DC/DC converter 300. It may be understood that the foregoing preset time period is preset based on the capacitance value of the bus capacitor 303. After being pre-charged in the preset time period, the difference between the voltage between the two ends of the bus capacitor 303 and the voltage between the two ends of the power battery 301 is smaller than the preset threshold.

Optionally, in some feasible implementations, the processor may further monitor the voltage between the two ends of the bus capacitor 303 and the voltage between the two ends of the power battery 301 in a real-time manner. When the difference between the voltage between the two ends of the bus capacitor 303 and the voltage between the two ends of the power battery 301 is smaller than the preset threshold, the processor controls the bidirectional DC/DC converter 300 to enter the first working state, and controls the contactor 305 to be turned on. In this case, the power battery 301 supplies power to the storage battery 302 or other devices such as an event data recorder, in the vehicle by using the bidirectional DC/DC converter 300.

The foregoing description is an example of an application of the bidirectional DC/DC converter in this embodiment of this application, rather than exhaustive. It should be understood that the bidirectional DC/DC converter in this application may be applied to any scenario that requires bidirectional energy transmission.

A specific structure of the bidirectional DC/DC converter is described below with reference to the accompanying drawings.

Figure 4:
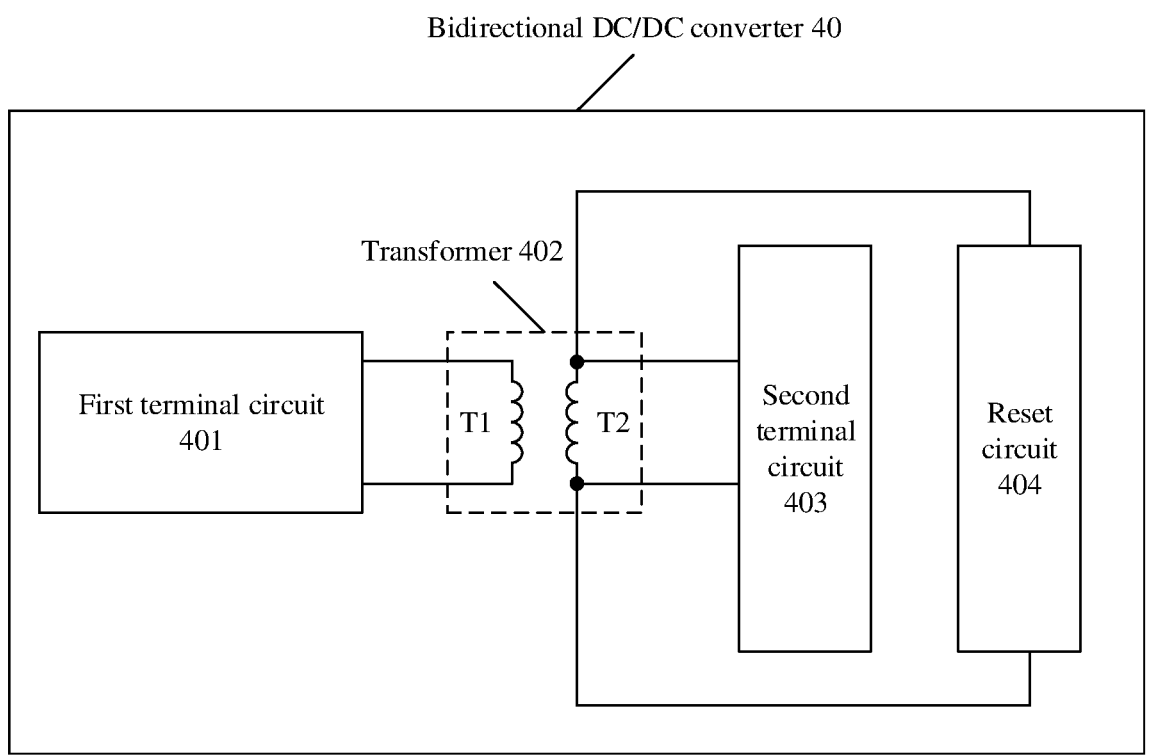
FIG. 4 is a block diagram of a structure of a bidirectional DC/DC converter according to an embodiment of this application.

Refer to FIG. 4. FIG. 4 is a block diagram of a structure of a bidirectional DC/DC converter according to an embodiment of this application. As shown in FIG. 4, a bidirectional DC/DC converter 40 includes a first terminal circuit 401, a transformer 402, a second terminal circuit 403, and a reset circuit 404. The transformer 402 includes a first winding T1 and a second winding T2. The first winding T1 and the second winding R2 are coupled by using a magnetic core. The first terminal circuit 401 is coupled to the first winding T1. The second terminal circuit 403 and the reset circuit 404 are coupled to the second winding T2.

The bidirectional DC/DC converter 40 includes at least two working states, for example, a first working state and a second working state.

When the bidirectional DC/DC converter 40 is in the first working state, the first terminal circuit 401 transmits a first alternating current to the second terminal circuit 403 by using the first winding T1 and the second winding T2, and the second terminal circuit 403 converts the first alternating current into a first direct current. In this case, the reset circuit 404 is in a broken state. In some feasible implementations, a second direct current power is coupled on one side of the first terminal circuit 401, and the first winding T1 is coupled on the other side. The first terminal circuit 401 converts a direct current provided by the second direct current power into a third alternating current. The third alternating current is loaded to two ends of the first winding T1, so that the second winding T2 induces the first alternating current. The second winding T2 transmits the first alternating current to the second terminal circuit 403. A magnitude relationship between the first alternating current and the third alternating current is related to a turn ratio of the first winding T1 to the second winding T2. The second winding T2 is coupled on one side of the second terminal circuit 403, and a second load is coupled on the other side. The second terminal circuit 403 converts the first alternating current into a first direct current, and provides the first direct current to the second load. To be specific, in the first working state of the bidirectional DC/DC converter 40, energy is transmitted from a side of the first terminal circuit 401 to a side of the second terminal circuit 403.

In a first time period in which the bidirectional DC/DC converter 40 is in the second working state, the second terminal circuit 403 transmits a second alternating current to the first terminal circuit 401 by using the second winding T2 and the first winding T1, and the first terminal circuit 401 converts the second alternating current into a second direct current. In some feasible implementations, the second winding T2 is coupled on one side of the second terminal circuit 403, and a third direct current power is further coupled on the other side. The second terminal circuit 403 converts a second direct current provided by the third direct current power into a fourth alternating current. The fourth alternating current is loaded to two ends of the second winding T2, so that the first winding T1 induces the second alternating current. The first winding T1 transmits the second alternating current to the first terminal circuit 401. A magnitude relationship between the fourth alternating current and the second alternating current is related to the turn ratio of the second winding T2 to the first winding T1. A third load is further coupled on one side of the first terminal circuit 401, and the first winding T1 is coupled on the other side. The first terminal circuit 401 converts the second alternating current into a second direct current, and provides the second direct current to the third load. To be specific, in the first time period in which the bidirectional DC/DC converter 40 is in the second working state, energy is transmitted from the side of the second terminal circuit 403 to the side of the first terminal circuit 401.

In a second time period in which the bidirectional DC/DC converter 40 is in the second working state, the second terminal circuit 403 stops transmitting the second alternating current to the first terminal circuit 401. In this case, the reset circuit 404 is conducted, to reset the second winding T2. It may be understood that resetting of the second winding T2 represents that energy of leakage inductance on the second winding T2 is released. The second working state of the bidirectional DC/DC converter 40 is a periodic working state. To be specific, the bidirectional DC/DC converter 40 is periodically switched between the first time period and the second time period. Energy of leakage inductance is accumulated on the second winding T2 in the first time period, and the energy of leakage inductance is released in the second time period by using the reset circuit 404, so that in a next period, the second winding T2 may transmit energy to the first terminal circuit 401 in the first time period in which the bidirectional DC/DC converter 40 is in the second working state.

The first terminal circuit 401 may be, for example, a phase-shifted full-bridge circuit in the conventional technology. The phase-shifted full-bridge circuit may include a metal-oxide semiconductor field-effect transistor (MOSFET), a transistor, an insulated gate bipolar transistor (IGBT), an anti-parallel diode of the IGBT, and the like. It may be understood that the phase-shifted full-bridge circuit can reset the first winding T1 without using an additional reset circuit.

The second terminal circuit 403 may be, for example, a forward circuit in the conventional technology. The forward circuit cannot reset the second winding T2. Therefore, in this embodiment of this application, the second winding T2 is reset by adding an additional reset circuit 404, so that energy of the bidirectional DC/DC converter 40 may be transmitted from the side of the second terminal circuit 403 to the side of the first terminal circuit 401. In other words, according to this embodiment of this application, a reset circuit is added, to implement bidirectional energy transmission of the DC/DC converter, which has strong applicability.

A specific connection relationship of the bidirectional DC/DC converter may be described in detail below with reference to a specific circuit diagram.

Figure 5:
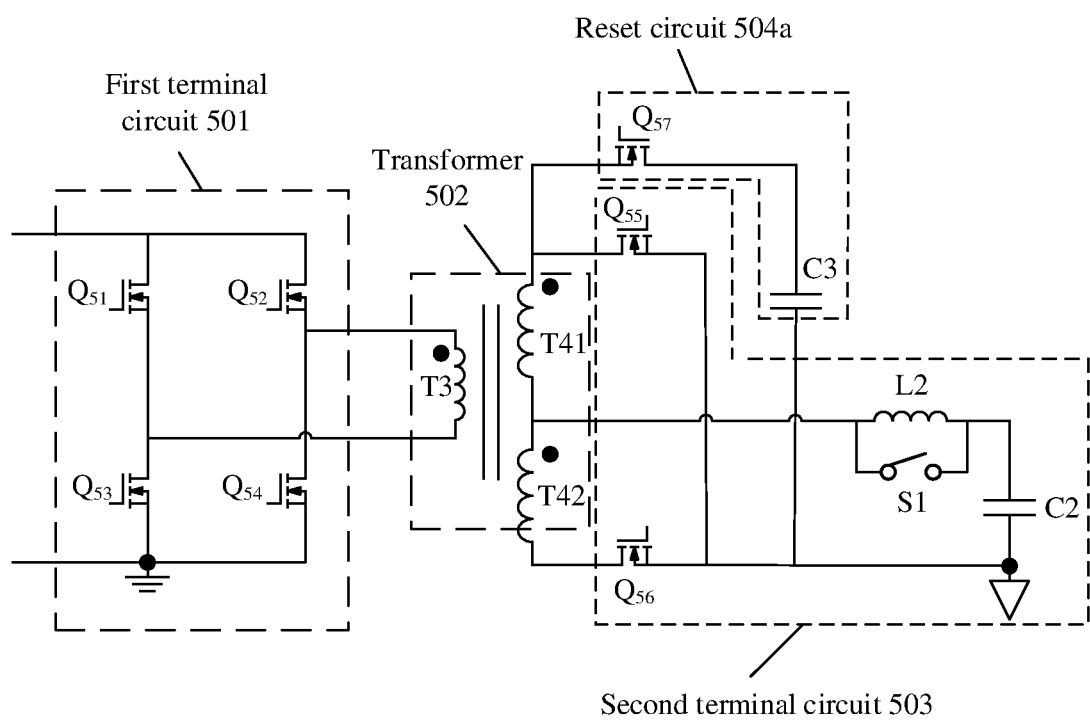
FIG. 5 is a circuit diagram of a bidirectional DC/DC converter according to an embodiment of this application.

In some feasible implementations, FIG. 5 is a circuit diagram of a bidirectional DC/DC converter according to an embodiment of this application. As shown in FIG. 5, the bidirectional DC/DC converter includes a first terminal circuit 501, a transformer 502, a second terminal circuit 503, and a reset circuit 5o4a. The transformer 502 includes a first winding T3 and a second winding, the second winding has a central tap, and the central tap is configured to divide the second winding into a first sub-winding T41 and a second sub-winding T42. An example in which a coupling point between an undotted terminal of the first sub-winding T41 and a dotted terminal of the second sub-winding T42 is the central tap is used in FIG. 5. In some feasible embodiments, if dotted terminals and undotted terminals of the first sub-winding T41 and the second sub-winding T42 may be reversed simultaneously, a coupling point between the dotted terminal of the first sub-winding T41 and the undotted terminal of the second sub-winding T42 is the central tap.

An example in which the first terminal circuit 501 is a phase-shifted full-bridge circuit in the conventional technology is used in FIG. 5. The first terminal circuit 501 includes four switch tubes, such as a fifth switch $Q_{51}$, a sixth switch $Q_{52}$, a seventh switch $Q_{53}$, and an eighth switch $Q_{54}$. It may be understood that the switch tubes in the first terminal circuit 501 may alternatively be a triode, an IGBT, and an anti-parallel diode of the IGBT. A representation form of the switch tube is not limited in this application. In a specific implementation, a drain of the fifth switch $Q_{51}$ and a drain of the sixth switch $Q_{52}$ are coupled to a first bus, and a source of the seventh switch $Q_{53}$ and a source of the eighth switch $Q_{54}$ are coupled to a second bus. A second direct current power such as a power battery and a third load such as a bus capacitor may be coupled between the first bus and the second bus. Optionally, a motor controller may be further coupled between the first bus and the second bus, and a contactor may be connected in series to the first bus or the second bus. A source of the fifth switch $Q_{51}$ and a drain of the seventh switch $Q_{53}$ are coupled to an undotted terminal of the first winding T3, and a source of the sixth switch $Q_{52}$ and a drain of the eighth switch $Q_{54}$ are coupled to a dotted terminal of the first winding T3. It may be understood that the dotted terminal and the undotted terminal of the first winding T3 can be reversed with each other (not shown in the figure). The first terminal circuit 501 may convert a direct current into an alternating current and transmit the alternating current to the first winding T3, or may rectify an alternating current of the first winding T3 into a direct current. For a specific control manner, refer to the conventional technology. Details are not described herein.

The second terminal circuit 503 is separately coupled to the dotted terminal of the first sub-winding T41, the central tap, and the undotted terminal of the second sub-winding T42. In a specific implementation, an example in which the second terminal circuit 503 is a forward circuit is used in FIG. 5. The second terminal circuit 503 includes a ninth switch $Q_{55}$, a tenth switch $Q_{56}$, an eleventh switch S1, a first inductor L2, and a second capacitor C2. It should be noted that the eleventh switch S1 may be a semiconductor switch such as an MOSFET, a triode, an IGBT, or an anti-parallel diode of the IGBT; or may be an electromagnetic switch such as a contactor or a relay. The dotted terminal of the first sub-winding T41 is coupled to a drain of the ninth switch $Q_{55}$, the central tap is coupled to one end of the first inductor L2 and one end of the eleventh switch S1, and the first inductor L2 is connected in parallel to the eleventh switch S1. The eleventh switch S1 is configured to be turned on when energy is transmitted from a side of the second terminal circuit 503 of the bidirectional DC/DC converter to a side of the first terminal circuit 501, so that the first inductor L2 is short-circuited, thereby reducing energy losses caused by the first inductor L2. The other end of the first inductor L2 and the other end of the eleventh switch S1 are coupled to one end of the second capacitor C2, the other end of the second capacitor C2 is coupled to a source of the ninth switch $Q_{55}$ and a source of the tenth switch $Q_{56}$, a drain of the tenth switch $Q_{56}$ is coupled to the undotted terminal of the second sub-winding T42, and the source of the tenth switch $Q_{56}$ is coupled to a reference ground.

The reset circuit 504a may be coupled between the dotted terminal of the first sub-winding T41 and the reference ground, or may be coupled between the undotted terminal of the second sub-winding T42 and the reference ground. The reference ground may be understood as that there is a potential terminal for providing an alternating current ground. For example, a voltage value of the reference ground may be 1.8 V, 1.25 V, or 0 V. This is not limited in this application.

In some feasible implementations, example description is made in FIG. 5 by using an example in which the reset circuit 504a is coupled between the dotted terminal of the first sub-winding T41 and the reference ground. The reset circuit 504a includes a first capacitor C3 and a first switch $Q_{57}$ connected in series to the first capacitor C3. In a specific implementation, a source of the first switch $Q_{57}$ is coupled to the dotted terminal of the first sub-winding T41, a drain of the first switch $Q_{57}$ is coupled to one end of the first capacitor C3, and the other end of the first capacitor C3 is coupled to the reference ground. The first switch $Q_{57}$ controls the first capacitor C3 to reset the second winding, such as the first sub-winding T41. It may be understood that if the reset circuit 504a is coupled between the undotted terminal of the second sub-winding T42 and the reference ground (not shown in the figure), the source of the first switch $Q_{57}$ is coupled to the undotted terminal of the second sub-winding T42, the drain of the first switch $Q_{57}$ is coupled to one end of the first capacitor C3, and the other end of the first capacitor C3 is coupled to the reference ground.

Gates of the foregoing switches are all coupled to a processor. Optionally, the gates of the switches may be coupled to different pins of a same processor, or may be coupled to different pins of different processors. The processors may communicate with each other, and control the first terminal circuit 501, the second terminal circuit 503, and the reset circuit 504a by controlling closing/opening of the switches together.

Figure 6:
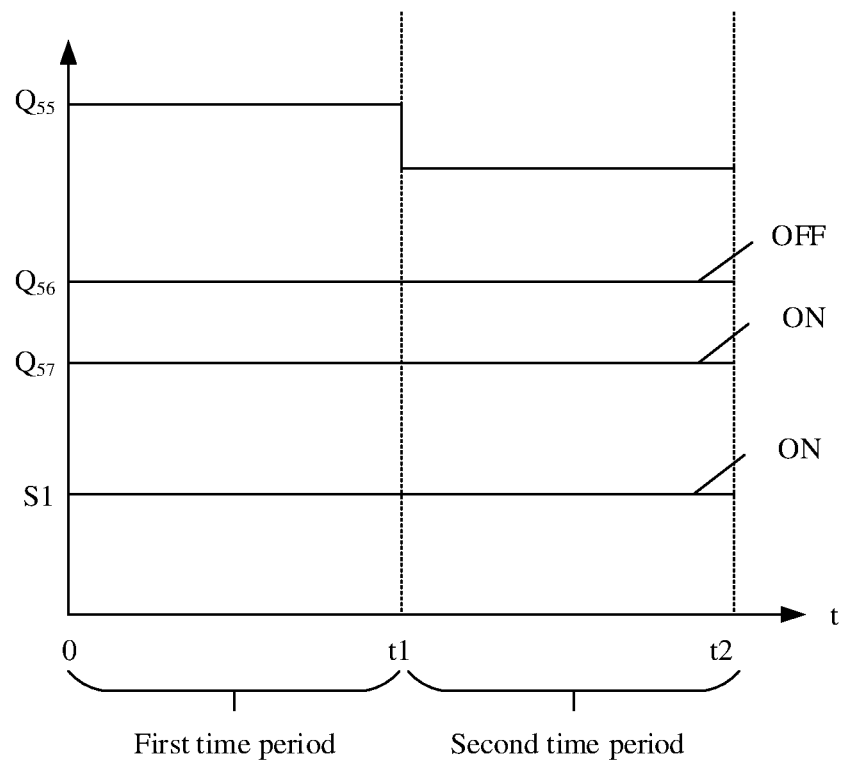
FIG. 6 is a control sequence diagram of a part of a bidirectional DC/DC converter according to an embodiment of this application.

A working principle of the bidirectional DC/DC converter in this embodiment of this application is described below with reference to FIG. 6 to FIG. 7B. In the first time period in which the bidirectional DC/DC converter is in the second working state, the processor controls the second terminal circuit 503 to transmit the second alternating current to the first terminal circuit 501 by using the first winding T3 and the second winding. In a specific implementation, FIG. 6 is a control sequence diagram of a part of a DC/DC converter according to an embodiment of this application. As shown in FIG. 6, in the first time period (that is, in a time period from 0 to t1), the processor controls the ninth switch $Q_{55}$ to be turned on, controls the tenth switch $Q_{56}$ to be turned off, and controls the first switch $Q_{57}$ to be turned on. It should be noted that, an example in which each switch is an N-channel enhanced MOS transistor is used in this embodiment of this application. A gate of each switch is turned on (that is, ON) after receiving a high-level signal, and is turned off (that is, OFF) when receiving a low-level signal. The first capacitor C3 may be reset in a short-circuit manner when both the ninth switch $Q_{55}$ and the first switch $Q_{57}$ are turned on. Optionally, the processor may further control the eleventh switch S1 to be turned on, so that the first inductor L2 is short-circuited, thereby preventing the first inductor L2 from transmitting energy from the side of the second terminal circuit 503 to the side of the first terminal circuit 501 to cause an energy loss.

Figure 7A:
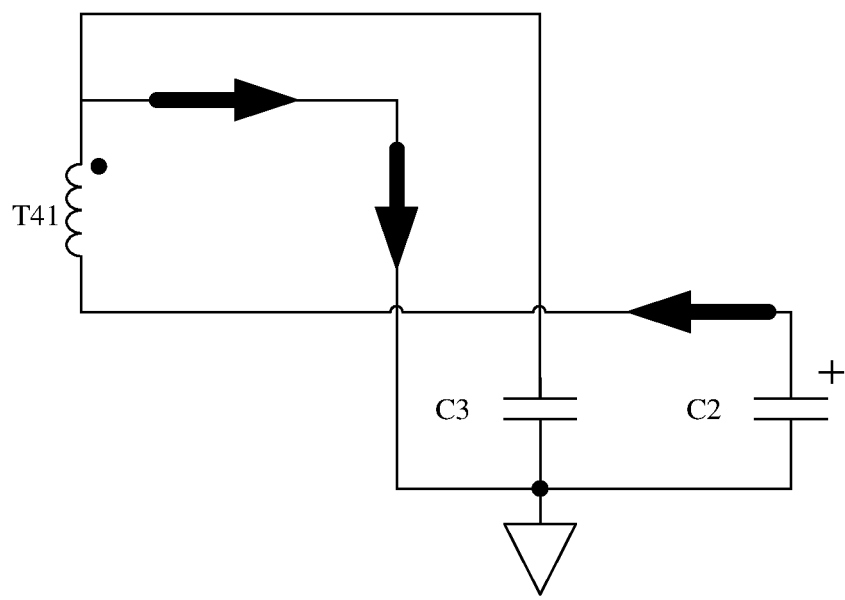
FIGS. 7A and 7B are equivalent circuit diagrams of a state of a part of a bidirectional DC/DC converter according to an embodiment of this application.

In this case, FIG. 7A is an equivalent circuit diagram of a state of a part of a bidirectional DC/DC converter according to an embodiment of this application. It should be noted that in this application, a turned-on switch is regarded as a wire to obtain equivalent circuit diagrams of various states of a part of the bidirectional DC/DC converter. As shown in FIG. 7A, in the time period from 0 to t1, the second capacitor C2 and/or the third direct current power such as the storage battery that is connected in parallel to the second capacitor C2, the first sub-winding T41, and the ninth switch $Q_{55}$ form a closed loop. To be specific, the second capacitor C2 in the second terminal circuit 503 transmits the second alternating current to the first terminal circuit 501 by using the first sub-winding T41. The processor further controls the first terminal circuit 501 to realize a rectification function, and converts the second alternating current into the second direct current, to provide the second direct current to the third load such as the bus capacitor.

In the second time period in which the bidirectional DC/DC converter is in the second working state, the processor controls the second terminal circuit 503 to stop transmitting the second alternating current to the first terminal circuit 501, and controls the reset circuit 504*a* to be conducted. In a specific implementation, as shown in FIG. 6, in the second time period (that is, in a time period from t1 to t2), the processor controls the ninth switch $Q_{55}$ to be turned off, so as to control the second terminal circuit 503 to stop transmitting the second alternating current to the first terminal circuit 501. The processor further controls the first switch $Q_{57}$ to be turned on. The first capacitor C3 is not short-circuited because the ninth switch $Q_{55}$ is in a turn-off state.

Figure 7B:
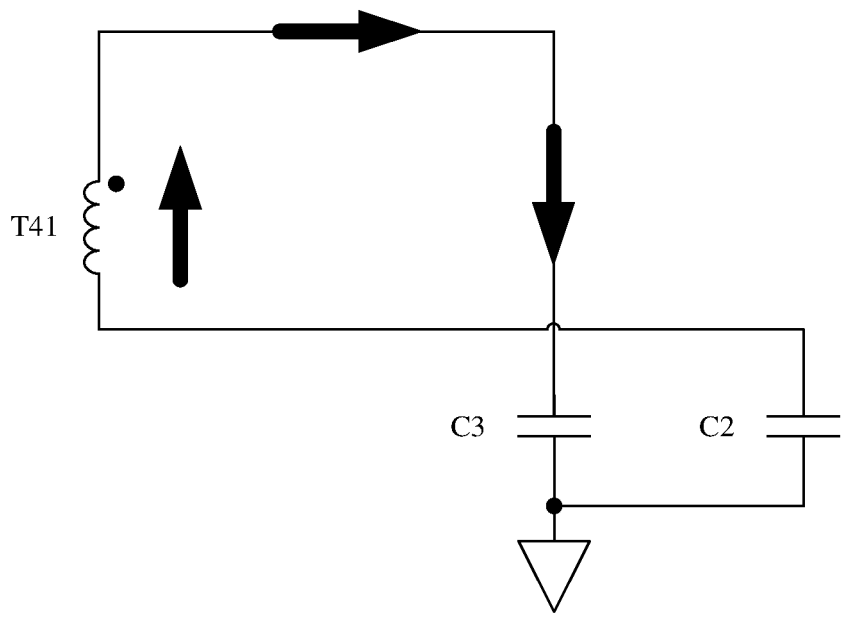

In this case, FIG. 7B is an equivalent circuit diagram of another state of a part of a bidirectional DC/DC converter according to an embodiment of this application. As shown in FIG. 7B, in the time period from t1 to t2, the first sub-winding T41, the first capacitor C3, and the second capacitor C2 form a closed loop (that is, a first reset loop). In this case, the reset circuit 504*a* is conducted, and the first capacitor C3 and the first sub-winding T41 perform resonant resetting. A winding may be understood as an inductor. A current of the inductor cannot be abruptly changed, that is, a current flowing through the first sub-winding T41 in the time period from 0 to t1 passes through the first switch $Q_{57}$, the first capacitor C3, and the second capacitor C2 in the time period from t1 to t2, to form the first reset loop. In this case, energy of leakage inductance on the first sub-winding T41 is transferred to the first capacitor C3, so that the second terminal circuit 503 may continue to transmit energy to the first terminal circuit 501 in a first time period of a next period. If the energy of leakage inductance on the first sub-winding T41 is not released, the first sub-winding T41 may be saturated and consequently cannot transmit energy. Optionally, in the time period from t1 to t2, the processor may control all switches in the first terminal circuit 501 to be turned off.

When the bidirectional DC/DC converter is in the first working state, the processor controls the first terminal circuit 501 to transmit the first alternating current to the second terminal circuit 503 by using the first winding T3 and the second winding. For example, the processor may control the first terminal circuit 501 to convert a direct current into an alternating current based on a phase-shift full-bridge control method in the conventional technology. The processor controls the second terminal circuit 503 to convert the first alternating current induced by the second winding into the first direct current. A specific implementation is controlling both the ninth switch $Q_{55}$ and the tenth switch $Q_{56}$ to be turned on, and controlling the eleventh switch S1 to be turned off. The processor further controls the reset circuit 504*a* to be turned off, that is, controls the first switch $Q_{57}$ to be turned off, thereby preventing the reset circuit 504*a* from affecting the first working state of the bidirectional DC/DC converter.

Figure 8:
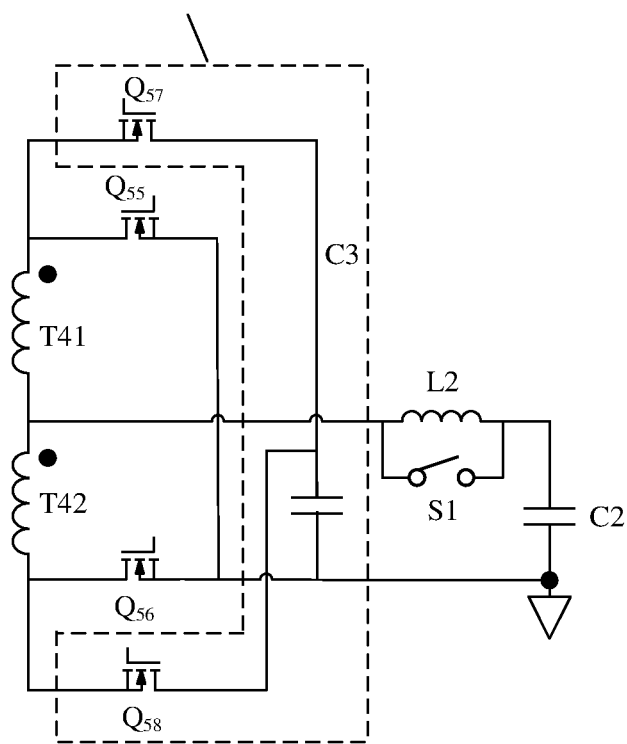
FIG. 8 is a partial circuit diagram of a bidirectional DC/DC converter according to an embodiment of this application.

According to this embodiment of this application, a reset circuit is added based on an existing DC/DC converter structure, and the reset circuit and the second winding perform resonant resetting, so that the energy of the DC/DC converter may be bidirectionally transmitted. Further, in some feasible implementations, the reset circuit further includes a second switch. FIG. 8 is a partial circuit diagram of a bidirectional DC/DC converter according to an embodiment of this application. As shown in FIG. 8, 504*a* in FIG. 5 is replaced with a reset circuit 504*b* shown in FIG. 8. In addition to the first capacitor C3 and the first switch $Q_{57}$, the reset circuit 504*b* further includes a second switch $Q_{58}$. It should be noted that for a specific connection relationship among the first terminal circuit, the first sub-winding, the second sub-winding, and the second terminal circuit in this embodiment of this application, refer to the description in FIG. 5. Details are not described herein again.

A specific connection relationship of the reset circuit 504*b* in the bidirectional DC/DC converter is as follows: A source of the second switch $Q_{58}$ is coupled to the undotted terminal of the second sub-winding T42 and the drain of the tenth switch $Q_{56}$, and a drain of the second switch $Q_{58}$ is coupled to the drain of the first switch $Q_{57}$ and one end of the first capacitor C3. In other words, the first switch $Q_{57}$ and the second switch $Q_{58}$ are connected in parallel and then are coupled to the first capacitor C3. The other end of the first capacitor C3 is coupled to the reference ground.

In a specific implementation, the first switch $Q_{57}$ resets the first capacitor C3 in a short-circuit manner in the first time period; is turned on in the second time period, so as to control the first capacitor C3 and the first sub-winding T41 to form a first reset loop; and breaks the first reset loop in a third time period and a fourth time period. The second switch $Q_{58}$ resets the first capacitor C3 in a short-circuit manner in the third time period; is turned on in the fourth time period, so as to control the first capacitor C3 and the second sub-winding T42 to form a second reset loop; and breaks the second reset loop in the first time period and the second time period.

Figure 9:
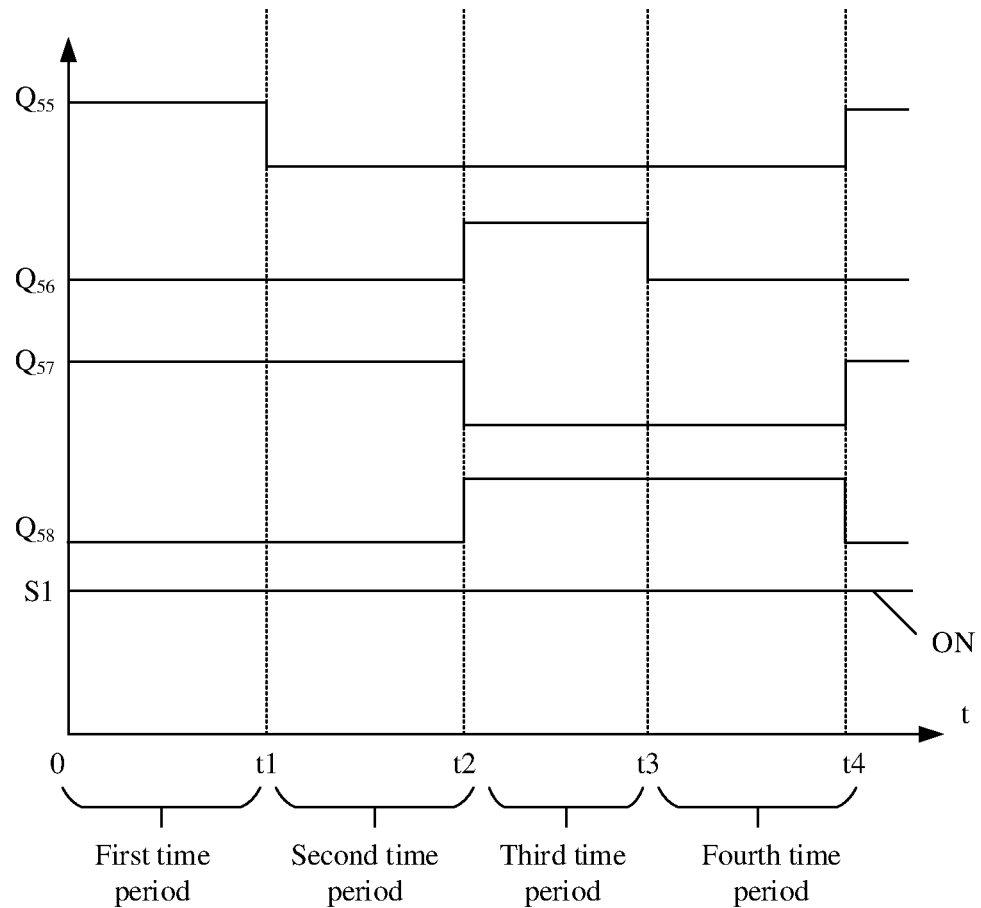
FIG. 9 is another control sequence diagram of a part of a bidirectional DC/DC converter according to an embodiment of this application.

A working principle of the bidirectional DC/DC converter in this embodiment of this application is described below with reference to FIG. 9 and FIG. 10B.

The second working state of the bidirectional DC/DC converter in this embodiment of this application is a periodic working state, and a corresponding period may include a first time period, a second time period, a third time period, and a fourth time period. For a control sequence diagram of various switches, refer to FIG. 9. The time sequence shown in FIG. 9 differs from the time sequence shown in FIG. 6 in that control for the second switch $Q_{58}$ is added and control for various switches in the third time period (that is, a time period from t2 to t3) and the fourth time period (that is, a time period from t3 to t4) is added. In other words, in the first time period in which the bidirectional DC/DC converter is in the second working state, in addition to controlling the ninth switch $Q_{55}$ to be turned on, controlling the tenth switch $Q_{56}$ to be turned off, controlling the first switch $Q_{57}$ to be turned on, and controlling the eleventh switch S1 to be turned on according to the embodiment described above with reference to FIG. 6, the processor also controls the second switch $Q_{58}$ to be turned off. Therefore, the equivalent circuit diagram described in FIG. 7A is obtained. In this case, energy is transmitted from the side of the second terminal circuit 503 to the side of the first terminal circuit 501, and the first capacitor C3 is reset in a short-circuit manner. Similarly, in the second time period in which the bidirectional DC/DC converter is in the second working state, in addition to controlling the ninth switch $Q_{55}$ to be turned off, controlling the tenth switch $Q_{56}$ to be turned off, controlling the first switch $Q_{57}$ to be turned on, and controlling the eleventh switch S1 to be turned on according to the embodiment described above with reference to FIG. 6, the processor further controls the second switch $Q_{58}$ to be turned off. Therefore, the equivalent circuit diagram described in FIG. 7B is obtained. In this case, the first sub-winding T41 and the first capacitor C3 form a first reset loop, and the first capacitor C3 and the first sub-winding T41 perform resonant resetting, so that the energy of leakage inductance on the first sub-winding T41 may be transferred to the first capacitor C3.

In the third time period in which the bidirectional DC/DC converter is in the second working state, the processor controls the second terminal circuit 503 to transmit the second alternating current to the first terminal circuit 501 by using the second winding and the first winding T3. In a specific implementation, as shown in FIG. 9, in the time period from t2 to t3, the processor controls the ninth switch $Q_{55}$ to be turned off, controls the tenth switch $Q_{56}$ to be turned on, controls the first switch $Q_{57}$ to be turned off, and controls the second switch $Q_{58}$ to be turned on. The first capacitor C3 may be reset in a short-circuit manner when both the tenth switch $Q_{56}$ and the second switch $Q_{58}$ are turned on. Optionally, the processor may further control the eleventh switch S1 to be turned on, so that the first inductor L2 is short-circuited, thereby preventing the first inductor L2 from transmitting energy from the side of the second terminal circuit 503 to the side of the first terminal circuit 501 to cause an energy loss.

Figure 10A:
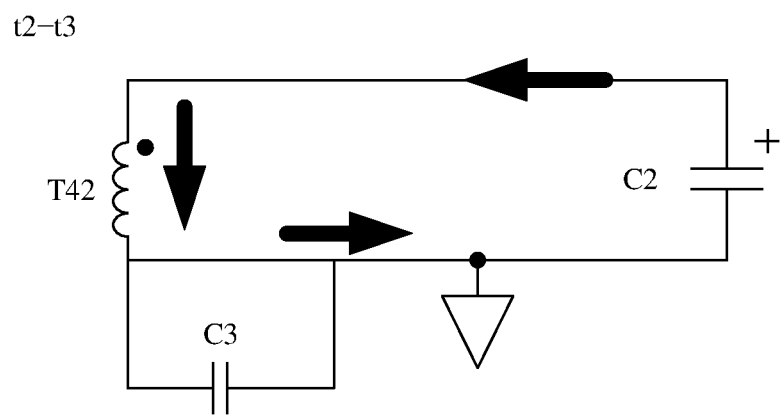
FIGS. 10A and 10B are other equivalent circuit diagrams of a part of a bidirectional DC/DC converter according to an embodiment of this application.

In this case, FIG. 10A is an equivalent circuit diagram of another state of a part of a bidirectional DC/DC converter according to an embodiment of this application. As shown in FIG. 10A, in the time period from t2 to t3, the second capacitor C2 and/or the third direct current power such as the storage battery that is connected in parallel to the second capacitor C2, the second sub-winding T42, and the tenth switch $Q_{56}$ form a closed loop. To be specific, the second capacitor C2 in the second terminal circuit 503 transmits the second alternating current to the first terminal circuit 501 by using the second sub-winding T42. The processor further controls the first terminal circuit 501 to realize a rectification function, and converts the second alternating current into the second direct current, to provide the second direct current to the third load such as the bus capacitor.

In the fourth time period in which the bidirectional DC/DC converter is in the second working state, the processor controls the second terminal circuit 503 to stop transmitting the second alternating current to the first terminal circuit 501, and controls the reset circuit 504b to be conducted. In a specific implementation, as shown in FIG. 9, in the time period from t3 to t4, the processor controls the tenth switch $Q_{56}$ to be turned off, so as to control the second terminal circuit to stop transmitting the second alternating current to the first terminal circuit 501. The processor further controls the second switch $Q_{58}$ to be turned on. The first capacitor C3 is not short-circuited because the tenth switch $Q_{56}$ is turned off.

Figure 10B:
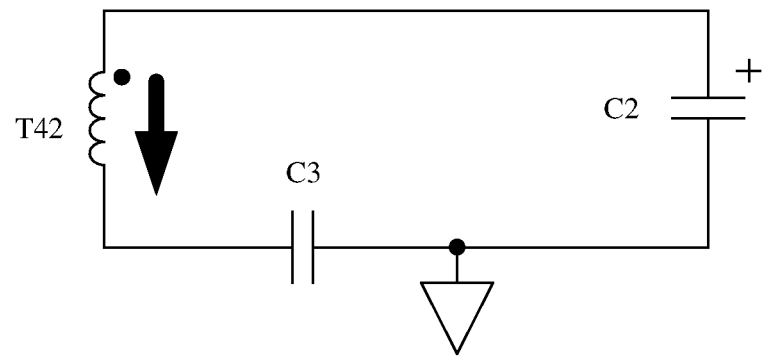

In this case, FIG. 10B is an equivalent circuit diagram of another state of a part of a bidirectional DC/DC converter according to an embodiment of this application. As shown in FIG. 10B, in the time period from t3 to t4, the second sub-winding T42, the first capacitor C3, and the second capacitor C2 form a closed loop (that is, a second reset loop). To be specific, the reset circuit 504b is conducted, and resetting is performed by the first capacitor C3 and the second sub-winding T42. To be specific, the first capacitor C3 and the second sub-winding T42 perform resonant resetting, so that energy of leakage inductance on the second sub-winding T42 may be transferred to the first capacitor C3. Optionally, in the time period from t3 to t4, the processor may control all switches in the first terminal circuit 501 to be turned off.

When the bidirectional DC/DC converter is in the first working state, for control for the processor for various switches, refer to the embodiment described above with reference to FIG. 5. Details are not described herein again.

The reset circuit in this embodiment of this application resets different sub-windings in different time periods by using two switches. Because an alternating current is induced by the second winding and the alternating current may be positive or negative, in a period of positive and negative half cycles of the alternating current, any one of the two sub-windings is in a working state. Compared with the implementation in which there is only one winding, in this embodiment of this application, energy transmission may be performed in both the positive and negative half cycles of the alternating current. However, in the implementation in which there is only one winding, energy transmission can be performed only in the positive or the negative half cycle of the alternating current, and consequently, half of the energy is wasted. In other words, by implementing this embodiment of this application, energy utilization may be further improved on the basis that bidirectional energy transmission is implemented.

Figure 11:
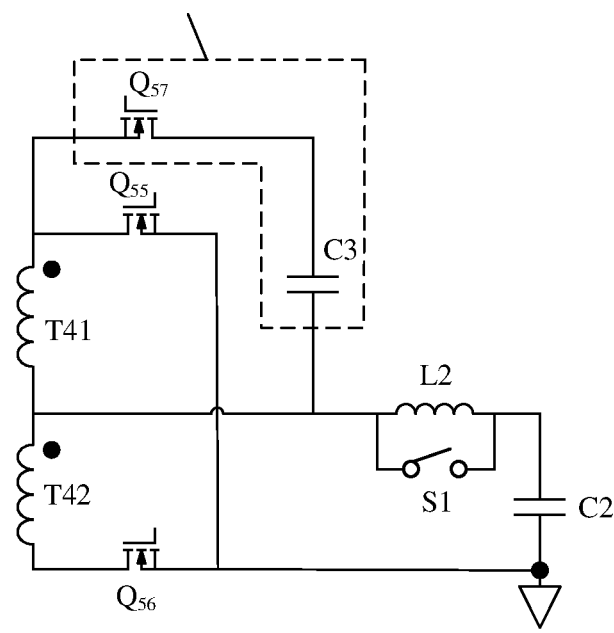
FIG. 11 is a partial circuit diagram of another bidirectional DC/DC converter according to an embodiment of this application.

FIG. 11 is a partial circuit diagram of another bidirectional DC/DC converter according to an embodiment of this application. The bidirectional DC/DC converter may include a reset circuit 504c shown in FIG. 11. It should be noted that the bidirectional DC/DC converter further includes a first terminal circuit, a transformer, and a second terminal circuit. The transformer includes a first winding and a second winding, the second winding has a central tap, and the central tap is configured to divide the second winding into a first sub-winding and a second sub-winding. For a specific implementation, refer to the embodiment described above with reference to FIG. 5. Details are not described herein again.

The reset circuit 504c may be coupled between the central tap and the dotted terminal of the first sub-winding T41 or may be coupled between the central tap and the undotted terminal of the second sub-winding T42.

In some feasible implementations, example description is made in FIG. 11 by using an example in which the reset circuit 504c is coupled between the central tap and the dotted terminal of the first sub-winding T41. The reset circuit 504c in this embodiment of this application has same elements as the reset circuit described in FIG. 5, and also includes the first capacitor C3 and the first switch $Q_{57}$ connected in series to the first capacitor C3. A difference is that a coupling point of the other end of the first capacitor C3 is different. As shown in FIG. 11, the source of the first switch $Q_{57}$ is coupled to the dotted terminal of the first sub-winding T41, the drain of the first switch $Q_{57}$ is coupled to one end of the first capacitor C3, and the other end of the first capacitor C3 is coupled to the central tap rather than the reference ground. It may be understood that if the reset circuit 504c is coupled between the central tap and the undotted terminal of the second sub-winding T42 (not shown in the figure), the source of the first switch $Q_{57}$ is coupled to the undotted terminal of the second sub-winding T42, the drain of the first switch $Q_{57}$ is coupled to one end of the first capacitor C3, and the other end of the first capacitor C3 is coupled to the central tap.

In this embodiment of this application, for control for various switches in the first time period and the second time period, refer to the embodiment described above with reference to FIG. 6. Details are not described herein again. Although control manners are the same, a different equivalent circuit is obtained because the coupling point of the first capacitor C3 is changed.

Figure 12A:
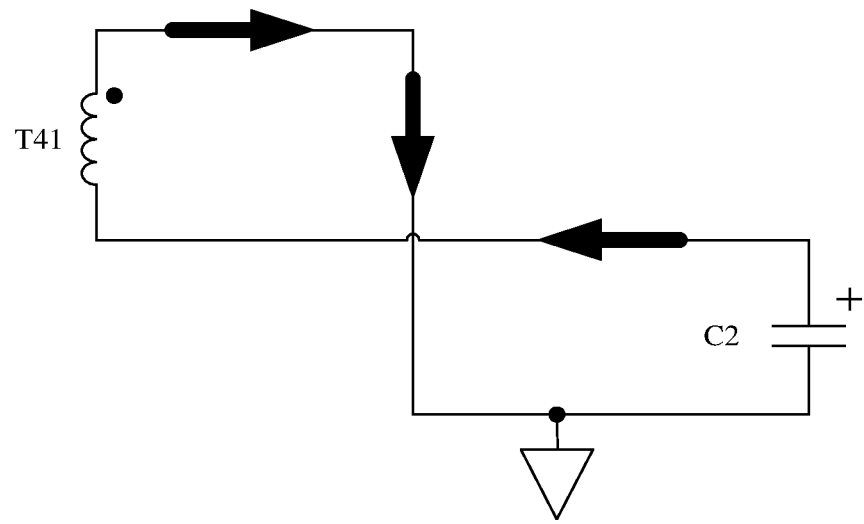
FIGS. 12A and 12B are other equivalent circuit diagrams of a part of a bidirectional DC/DC converter according to an embodiment of this application.

FIG. 12A is an equivalent circuit diagram of another state of a part of a bidirectional DC/DC converter according to an embodiment of this application. As shown in FIG. 12A, in the time period from 0 to t1, the second capacitor C2 and/or the third direct current power such as the storage battery that is connected in parallel to the second capacitor C2, the first sub-winding T41, and the ninth switch $Q_{55}$ form a closed loop. To be specific, the second capacitor C2 in the second terminal circuit transmits the second alternating current to the first terminal circuit 501 by using the first sub-winding T41. The processor further controls the first terminal circuit to realize a rectification function, and converts the second alternating current into the second direct current, to provide the second direct current to the third load such as the bus capacitor. In this case, although both the ninth switch $Q_{55}$ and the first switch $Q_{57}$ are turned off, the first capacitor C3 is not short-circuited.

Figure 12B:
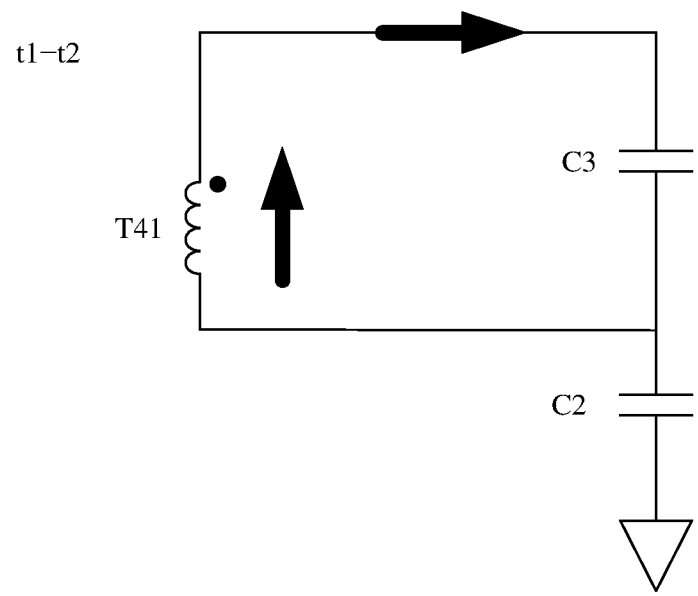

FIG. 12B is an equivalent circuit diagram of another state of a part of a bidirectional DC/DC converter according to an embodiment of this application. As shown in FIG. 12B, in the time period from t1 to t2, the first sub-winding T41 and the first capacitor C3 form a closed loop (that is, a third reset loop). In this case, the reset circuit 504c is conducted, to reset the first sub-winding T41. Because the other end of the first capacitor C3 is not coupled to the reference ground, that is, the energy of the first sub-winding T41 that is transferred to the first capacitor C3 is not completely released, voltage of the first capacitor C3 may be stabilized at a constant value, to form a voltage clamp.

Optionally, in the time period from t1 to t2, the processor may control all switches in the first terminal circuit to be turned off.

For a control manner used when the bidirectional DC/DC converter is in the first working state, refer to the embodiment described with reference to FIG. 5. Details are not described herein again.

According to this embodiment of this application, the coupling point of the reset circuit is changed, so that an active clamping circuit may be formed between the reset circuit and the first sub-winding or the second sub-winding. Energy of the first sub-winding and the second sub-winding is transferred to the first capacitor in the reset circuit through the active clamping circuit, so that bidirectional energy transmission of the DC/DC converter may be implemented.

Figure 13:
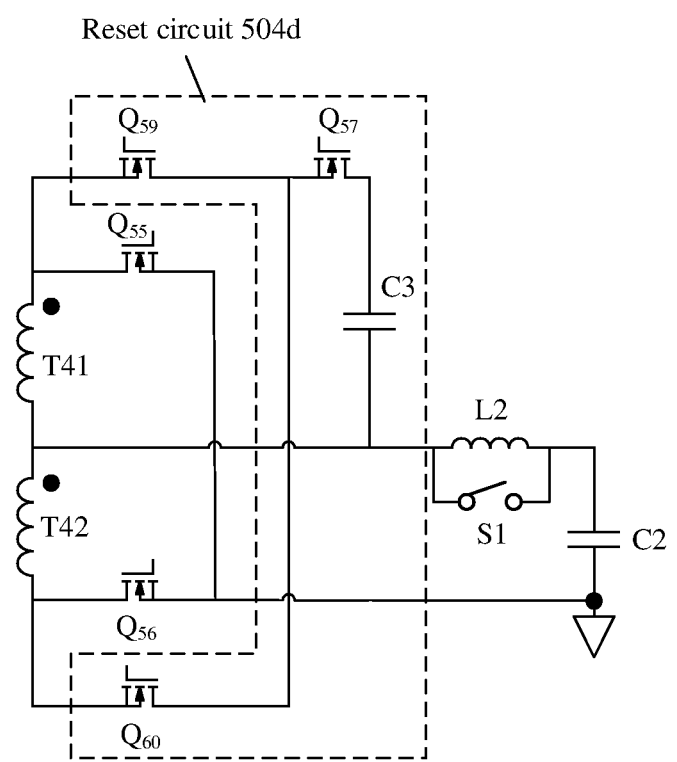
FIG. 13 is a partial circuit diagram of another bidirectional DC/DC converter according to an embodiment of this application.

Further, in some feasible implementations, the reset circuit further includes a third switch and a fourth switch. FIG. 13 is a partial circuit diagram of another bidirectional DC/DC converter according to an embodiment of this application. As shown in FIG. 13, the reset circuit 504a in FIG. 5 is replaced with a reset circuit 504d shown in FIG. 13. In addition to the first capacitor C3 and the first switch $Q_{57}$, the reset circuit 504d further includes a third switch $Q_{59}$ and a fourth switch $Q_{60}$. Similarly, for a specific connection relationship among the first terminal circuit, the first sub-winding, the second sub-winding, and the second terminal circuit in this embodiment of this application, refer to the description in FIG. 5. Details are not described herein again.

A specific connection relationship of the reset circuit 504d in the bidirectional DC/DC converter is as follows: A source of the third switch $Q_{59}$ is coupled to the dotted terminal of the first sub-winding T41 and the drain of the ninth switch $Q_{55}$, and a source of the fourth switch $Q_{60}$ is coupled to the undotted terminal of the second sub-winding T42 and the drain of the tenth switch $Q_{56}$; and a drain of the third switch $Q_{59}$ and a drain of the fourth switch $Q_{60}$ are both coupled to the source of the first switch $Q_{57}$, and the drain of the first switch $Q_{57}$ is coupled to one end of the first capacitor C3. In other words, the third switch $Q_{59}$ and the fourth switch $Q_{60}$ are connected in parallel and then are connected in series to the first switch $Q_{57}$ and the first capacitor C3. The other end of the first capacitor C3 is coupled to the central tap.

In a specific implementation, both the third switch $Q_{59}$ and the first switch $Q_{57}$ are turned on in the second time period, to control the first sub-winding T41 and the first capacitor C3 to form a closed loop (that is, the third reset loop); and the first switch $Q_{57}$ is turned off in the first time period, to break the third reset loop. Both the fourth switch $Q_{60}$ and the first switch $Q_{57}$ are turned on in the fourth time period, to control the second sub-winding T42 and the first capacitor C3 to form a closed loop (that is, a fourth reset loop). The first switch $Q_{57}$ is turned off in the third time period, to break the fourth reset loop.

A working principle of the bidirectional DC/DC converter in this embodiment of this application is described below with reference to FIG. 14 and FIG. 15B.

The second working state of the bidirectional DC/DC converter in this embodiment of this application is a periodic working state, and a corresponding period may include a first time period, a second time period, a third time period, and a fourth time period. For a control sequence diagram of various switches, refer to FIG. 14. FIG. 14 is another control sequence diagram of a part of a bidirectional DC/DC converter according to an embodiment of this application.

Figure 14:
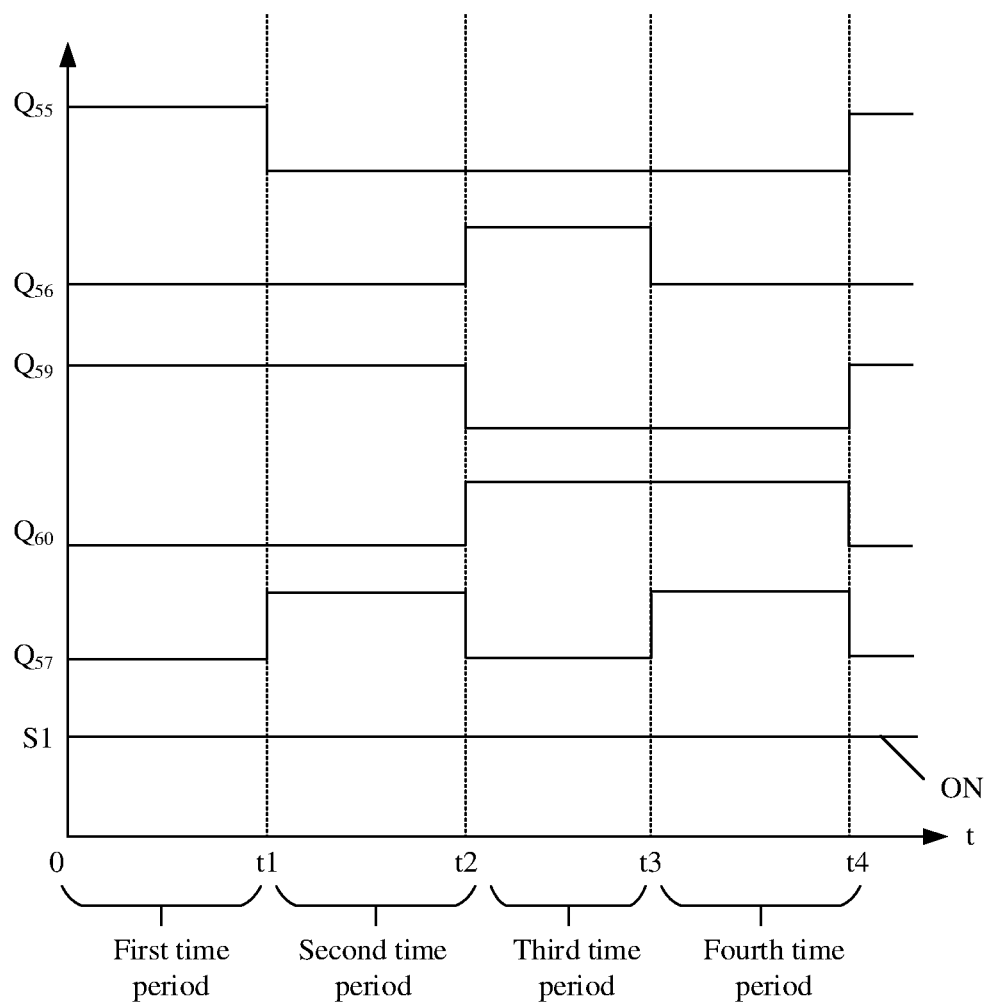
FIG. 14 is another control sequence diagram of a part of a bidirectional DC/DC converter according to an embodiment of this application.

As shown in FIG. 14, in the first time period (that is, in the time period from 0 to t1), the processor controls the ninth switch $Q_{55}$ to be turned on, controls the tenth switch $Q_{56}$ to be turned off, controls the third switch $Q_{59}$ to be turned on, controls the fourth switch $Q_{60}$ to be turned off, and controls the first switch $Q_{57}$ to be turned off. Optionally, the processor may further control the eleventh switch S1 to be turned on, so that the first inductor L2 is short-circuited, thereby preventing the first inductor L2 from transmitting energy from the side of the second terminal circuit 503 to the side of the first terminal circuit 501 to cause an energy loss. In this case, for a partial circuit diagram of the bidirectional DC/DC converter, refer to FIG. 12A. For how the second terminal circuit implements energy transmission to the first terminal circuit, still refer to the embodiment described above with reference to FIG. 12A. Details are not described herein again.

In the second time period (that is, in the time period from t1 to t2), the processor controls the ninth switch $Q_{55}$ to be turned off, controls the tenth switch $Q_{56}$ to be turned off, controls the third switch $Q_{59}$ to be turned on, controls the fourth switch $Q_{60}$ to be turned off, and controls the first switch $Q_{57}$ to be turned on. In this case, for a partial circuit diagram of the bidirectional DC/DC converter, refer to FIG. 12B. For how to reset the first sub-winding T41, still refer to the embodiment described above with reference to FIG. 12B. Details are not described herein again.

In the third time period (that is, in a time period from t2 to t3) when the bidirectional DC/DC converter is in the second working state, the processor controls the second terminal circuit to transmit the second alternating current to the first terminal circuit by using the second winding and the first winding. In a specific implementation, as shown in FIG. 14, in the time period from t2 to t3, the processor controls the ninth switch $Q_{55}$ to be turned off, controls the tenth switch $Q_{56}$ to be turned on, controls the third switch $Q_{59}$ to be turned off, controls the fourth switch $Q_{60}$ to be turned on, and controls the first switch $Q_{57}$ to be turned off. Optionally, the processor may further control the eleventh switch S1 to be turned on, so that the first inductor L2 is short-circuited, thereby preventing the first inductor L2 from transmitting energy from the side of the second terminal circuit 503 to the side of the first terminal circuit 501 to cause an energy loss.

Figure 15A:
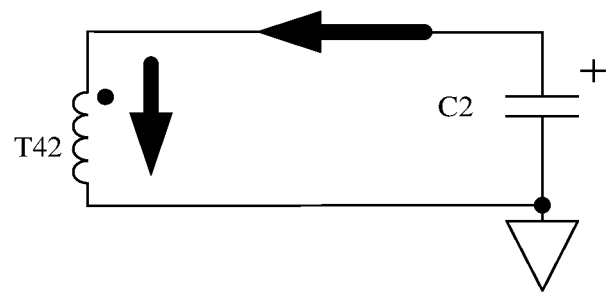
FIGS. 15A and 15B are other equivalent circuit diagrams of a part of a bidirectional DC/DC converter according to an embodiment of this application.

In this case, FIG. 15A is an equivalent circuit diagram of another state of a part of a bidirectional DC/DC converter according to an embodiment of this application. As shown in FIG. 15A, in the time period from t2 to t3, the second capacitor C2 and/or the third direct current power such as the storage battery that is connected in parallel to the second capacitor C2, the second sub-winding T42, and the tenth switch $Q_{56}$ form a closed loop. To be specific, the second capacitor C2 in the second terminal circuit transmits the second alternating current to the first terminal circuit by using the second sub-winding T42.

The processor further controls the first terminal circuit 501 to realize a rectification function, and converts the second alternating current into the second direct current, to provide the second direct current to the third load such as the bus capacitor.

In the fourth time period (that is, in the time period from t3 to t4) in which the bidirectional DC/DC converter is in the second working state, the processor controls the second terminal circuit to stop transmitting the second alternating current to the first terminal circuit, and controls the reset circuit 504d to be conducted. In a specific implementation, as shown in FIG. 14, in the time period from t3 to t4, the processor controls the tenth switch $Q_{56}$ to be turned off, so as to control the second terminal circuit to stop transmitting the second alternating current to the first terminal circuit. The processor further controls the first switch $Q_{57}$ to be turned on.

Figure 15B:
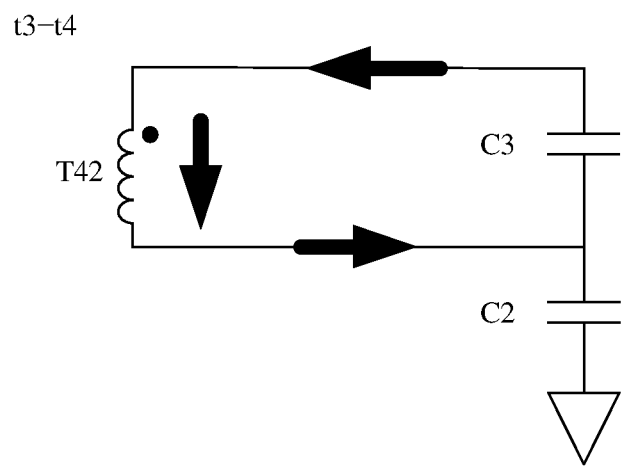

In this case, FIG. 15B is an equivalent circuit diagram of another state of a part of a bidirectional DC/DC converter according to an embodiment of this application. As shown in FIG. 15B, in the time period from t3 to t4, the second sub-winding T42 and the first capacitor C3 form a fourth reset loop, to reset the second sub-winding T42. Optionally, in the time period from t3 to t4, the processor may control all switches in the first terminal circuit to be turned off.

According to this embodiment of this application, the third switch and the fourth switch are added, so that the first sub-winding or the second sub-winding may be selected in different time periods to form a closed loop with the reset circuit. In other words, according to this embodiment of this application, a winding is reset in an active-clamping manner, and two formed forward circuits may alternately perform energy transmission in positive and negative half cycles of an alternating current, so that energy utilization may be further improved on the basis that bidirectional energy transmission is implemented.

In addition, an embodiment of this application further provides a vehicle. The vehicle includes the vehicle power supply system described above, or may be understood as that the vehicle includes any bidirectional DC/DC converter described above. The vehicle includes a processor, and the processor may be disposed independent from the vehicle power supply system or independent from the bidirectional DC/DC converter.

It should be noted that the terms such as "first" and "second" are used only for the purpose of description, and should be understood as indicating or implying relative importance.

The units described as separate components may or may not be physically separate, and components displayed as units may or may not be physical units. To be specific, the components may be located at one position, or may be distributed on a plurality of network units. Some or all of the units may be selected based on an actual requirement to achieve the objectives of the solutions in embodiments in this application.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A bidirectional DC/DC converter, comprising:
a first terminal circuit;
a transformer comprising a first winding and a second winding, wherein the first terminal circuit is coupled to the first winding;
a second terminal circuit; and
a reset circuit, wherein the second terminal circuit and the reset circuit are coupled to the second winding;
wherein when the bidirectional DC/DC converter is in a first working state, the first terminal circuit is configured to transmit a first alternating current to the second terminal circuit through the first winding and the second winding, the second terminal circuit is configured to convert the first alternating current into a first direct current, and the reset circuit is in a broken state;
wherein in a first time period in which the bidirectional DC/DC converter is in a second working state, the second terminal circuit is configured to transmit a second alternating current to the first terminal circuit through the second winding and the first winding, and the first terminal circuit is configured to convert the second alternating current into a second direct current; and
wherein in a second time period in which the bidirectional DC/DC converter is in the second working state, the reset circuit is in a conducted state, the reset circuit is configured to reset the second winding, and the second terminal circuit is configured to stop transmitting the second alternating current to the first terminal circuit.

2. The bidirectional DC/DC converter according to claim 1, wherein:
the second winding has a central tap, and the central tap is configured to divide the second winding into a first sub-winding and a second sub-winding; and
the second terminal circuit is separately coupled to a dotted terminal of the first sub-winding, the central tap, and an undotted terminal of the second sub-winding; and
the reset circuit is coupled between the dotted terminal of the first sub-winding and a reference ground or the reset circuit is coupled between the undotted terminal of the second sub-winding and the reference ground.

3. The bidirectional DC/DC converter according to claim 1, wherein:
the second winding has a central tap, and the central tap is configured to divide the second winding into a first sub-winding and a second sub-winding;
the second terminal circuit is separately coupled to a dotted terminal of the first sub-winding, the central tap, and an undotted terminal of the second sub-winding; and the reset circuit is coupled between the central tap and the dotted terminal of the first sub-winding or is coupled between the central tap and the undotted terminal of the second sub-winding.

4. The bidirectional DC/DC converter according to claim 1, wherein the reset circuit comprises a first capacitor and a first switch connected in series to the first capacitor, and the first switch is configured to control the first capacitor to reset the second winding.

5. The bidirectional DC/DC converter according to claim 4, wherein:
a corresponding working period in which the bidirectional DC/DC converter is in the second working state comprises the first time period, the second time period, a third time period, and a fourth time period;
the first switch is configured to: control, in the second time period, a first sub-winding of the second winding to form a first reset loop with the first capacitor, reset the first capacitor in a short-circuit manner in the first time period, and break the first reset loop in the third time period and the fourth time period; and
the reset circuit further comprises a second switch, and the second switch is configured to: control, in the fourth time period, a second sub-winding of the second winding to form a second reset loop with the first capacitor, break the second reset loop in the first time period and the second time period, and reset the first capacitor in a short-circuit manner in the third time period.

6. The bidirectional DC/DC converter according to claim 4, wherein:
a corresponding working period in which the bidirectional DC/DC converter is in the second working state comprises the first time period, the second time period, a third time period, and a fourth time period;
the reset circuit further comprises a third switch and a fourth switch;
the third switch is coupled to a dotted terminal of a first sub-winding of the second winding, the fourth switch is coupled to an undotted terminal of a second sub-winding of the second winding, and the third switch and the fourth switch are connected in parallel to each other and are connected in series to the first switch and the first capacitor;
the third switch and the first switch are configured to control, in the second time period, the first sub-winding to form a third reset loop with the first capacitor;
the fourth switch and the first switch are configured to control, in the fourth time period, the second sub-winding to form a fourth reset loop with the first capacitor; and
the first switch is further configured to: break the third reset loop in the first time period, and break the fourth reset loop in the third time period.

7. A bidirectional DC/DC converter control method, comprising:
in a first time period in which the bidirectional DC/DC converter is in a second working state, controlling a second terminal circuit to transmit a second alternating current to a first terminal circuit through a second winding and a first winding, and controlling the first terminal circuit to convert the second alternating current into a second direct current, wherein the bidirectional DC/DC converter comprises the first terminal circuit, a transformer, the second terminal circuit, and a reset circuit, the transformer comprises the first winding and the second winding, the first terminal circuit is coupled to the first winding, and the second terminal circuit and the reset circuit are coupled to the second winding;
in a second time period in which the bidirectional DC/DC converter is in the second working state, controlling the second terminal circuit to stop transmitting the second alternating current to the first terminal circuit, and controlling the reset circuit to be conducted, so as to reset the second winding; and
when the bidirectional DC/DC converter is in a first working state, controlling the first terminal circuit to transmit a first alternating current to the second terminal circuit through the first winding and the second winding, controlling the second terminal circuit to convert the first alternating current into a first direct current, and controlling the reset circuit to be broken.

8. The control method according to claim 7, wherein the reset circuit comprises a first capacitor and a first switch connected in series to the first capacitor, and controlling the reset circuit to be conducted, so as to reset the second winding comprises:
controlling the first switch to be turned on, to enable the first capacitor to reset the second winding.

9. The control method according to claim 8, wherein:
a corresponding working period in which the bidirectional DC/DC converter is in the second working state comprises the first time period, the second time period, a third time period, and a fourth time period;
the reset circuit further comprises a second switch, the first switch is coupled to a dotted terminal of a first sub-winding, the second switch is coupled to an undotted terminal of a second sub-winding, and the first switch and the second switch are connected in parallel to each other and are connected in series to the first capacitor; and
controlling the first switch to be turned on, to enable the first capacitor to reset the second winding comprises:
controlling the first switch to be turned on in the second time period, to enable the first sub-winding to form a first reset loop with the first capacitor, controlling the first switch to be turned on in the first time period, to reset the first capacitor with a short-circuit, and controlling the first switch to be turned off in the third time period and the fourth time period; and
controlling the second switch to be turned on in the fourth time period, to enable the second sub-winding to form a second reset loop with the first capacitor, controlling the second switch to be turned on in the third time period, to reset the first capacitor with a short-circuit, and controlling the second switch to be turned off in the first time period and the second time period.

10. The control method according to claim 8, wherein:
a corresponding working period in which the bidirectional DC/DC converter is in the second working state comprises the first time period, the second time period, a third time period, and a fourth time period;
the reset circuit comprises a third switch and a fourth switch, the third switch is coupled to a dotted terminal of a first sub-winding, the fourth switch is coupled to an undotted terminal of a second sub-winding, and the third switch and the fourth switch are connected in parallel to each other and are connected in series to the first switch and the first capacitor; and
controlling the first switch to be turned on, to enable the first capacitor to reset the second winding comprises:

controlling the third switch and the first switch to be turned on in the second time period, to control the first sub-winding to form a third reset loop with the first capacitor, and controlling the first switch to be turned off in the first time period, to break the third reset loop; and controlling the fourth switch and the first switch to be turned on in the first time period, to control the second sub-winding to form a fourth reset loop with the first capacitor, and controlling the first switch to be turned off in the third time period, to break the fourth reset loop.

11. A vehicle power supply system, wherein the vehicle power supply system comprises:
a bus capacitor;
a motor controller;
a contactor; and
a bidirectional DC/DC converter, wherein the bidirectional DC/DC converter comprises a first terminal circuit, a transformer comprising a first winding and a second winding, a second terminal circuit, and a reset circuit, wherein the first terminal circuit is coupled to the first winding, and the second terminal circuit and the reset circuit are coupled to the second winding;

Wherein the motor controller and the bus capacitor are coupled to two ends of the first terminal circuit of the bidirectional DC/DC converter in parallel, and the motor controller is configured to control rotation of a motor, to supply power to a vehicle;

the motor controller and the bus capacitor are coupled to a power battery through the contactor;

two ends of the second terminal circuit of the bidirectional DC/DC converter are coupled to a storage battery in parallel, and the bidirectional DC/DC converter is configured to pre-charge the bus capacitor with the storage battery when the bidirectional DC/DC converter is in a second working state; and the contactor is configured to be turned on when a difference between a voltage between two ends of the bus capacitor and a voltage between two ends of the power battery is less than a preset threshold, to enable the bidirectional DC/DC converter to enter a first working state, and the power battery is configured to supply power to the storage battery or another device in the vehicle through the bidirectional DC/DC converter when the bidirectional DC/DC converter is in the first working state.

12. The vehicle power supply system according to claim 11, wherein:
the second winding has a central tap configured to divide the second winding into a first sub-winding and a second sub-winding;
the second terminal circuit is separately coupled to a dotted terminal of the first sub-winding, the central tap, and an undotted terminal of the second sub-winding; and
the reset circuit is coupled between the dotted terminal of the first sub-winding and a reference ground or is coupled between the undotted terminal of the second sub-winding and the reference ground.

13. The vehicle power supply system according to claim 11, wherein:

the second winding has a central tap configured to divide the second winding into a first sub-winding and a second sub-winding; and the second terminal circuit is separately coupled to a dotted terminal of the first sub-winding, the central tap, and an undotted terminal of the second sub-winding; and the reset circuit is coupled between the central tap and the dotted terminal of the first sub-winding or is coupled between the central tap and the undotted terminal of the second sub-winding.

14. The vehicle power supply system according to claim 11, wherein the reset circuit comprises a first capacitor and a first switch connected in series to the first capacitor, and the first switch is configured to control the first capacitor to reset the second winding.

15. The vehicle power supply system according to claim 14, wherein:
a corresponding working period in which the bidirectional DC/DC converter is in the second working state comprises a first time period, a second time period, a third time period, and a fourth time period;
the first switch is configured to: control, in the second time period, a first sub-winding of the second winding to form a first reset loop with the first capacitor, reset the first capacitor in a short-circuit manner in the first time period, and break the first reset loop in the third time period and the fourth time period; and
the reset circuit further comprises a second switch, and the second switch is configured to: control, in the fourth time period, a second sub-winding of the second winding to form a second reset loop with the first capacitor, break the second reset loop in the first time period and the second time period, and reset the first capacitor in a short-circuit manner in the third time period.

16. The vehicle power supply system according to claim 14, wherein:
a corresponding working period in which the bidirectional DC/DC converter is in the second working state comprises a first time period, a second time period, a third time period, and a fourth time period;
the reset circuit further comprises a third switch and a fourth switch;
the third switch is coupled to a dotted terminal of a first sub-winding of the second winding, the fourth switch is coupled to an undotted terminal of a second sub-winding of the second winding, and the third switch and the fourth switch are connected in parallel and then are connected in series to the first switch and the first capacitor;
the third switch and the first switch are configured to control, in the second time period, the first sub-winding to form a third reset loop with the first capacitor;
the fourth switch and the first switch are configured to control, in the fourth time period, the second sub-winding to form a fourth reset loop with the first capacitor; and
the first switch is further configured to: break the third reset loop in the first time period, and break the fourth reset loop in the third time period.

* * * * *